(12) United States Patent
Jun et al.

(10) Patent No.: US 11,677,932 B2
(45) Date of Patent: Jun. 13, 2023

(54) IMAGE PROCESSING DEVICE

(71) Applicant: SAMSUNG ELECTRONICS CO., LTD., Suwon-si (KR)

(72) Inventors: Sung Ho Jun, Hwaseong-si (KR); Yo-Han Lim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/243,657

(22) Filed: Apr. 29, 2021

(65) Prior Publication Data

US 2021/0250575 A1     Aug. 12, 2021

Related U.S. Application Data

(63) Continuation of application No. 16/252,796, filed on Jan. 21, 2019, now Pat. No. 11,044,466.

(30) Foreign Application Priority Data

Jan. 26, 2018 (KR) .................. 10-2018-0010162
Apr. 10, 2018 (KR) .................. 10-2018-0041788

(51) Int. Cl.
*H04N 19/103*     (2014.01)
*H04N 19/91*     (2014.01)
(Continued)

(52) U.S. Cl.
CPC ......... *H04N 19/103* (2014.11); *H04N 19/124* (2014.11); *H04N 19/182* (2014.11); *H04N 19/91* (2014.11)

(58) Field of Classification Search
None
See application file for complete search history.

(56) References Cited

U.S. PATENT DOCUMENTS 6,480,542 B1    11/2002   Prange et al.
8,311,107 B2    11/2012   Odagiri et al.
(Continued)

FOREIGN PATENT DOCUMENTS

CN     103477636     12/2013
CN     104834627     8/2015
(Continued)

OTHER PUBLICATIONS

Search Report and Written Opinion dated Sep. 17, 2019 in corresponding Application No. SG 10201810653X.
(Continued)

*Primary Examiner* — James M Anderson, II
(74) *Attorney, Agent, or Firm* — F. Chau & Associates, LLC

(57) ABSTRACT

An image processing device for performing a data decompression is provided. The image processing device includes a decoder circuit having a plurality of stages for decompressing compressed image data of a plurality of pixels. The decoder circuit is configured to divide the pixels into a plurality of groups. The first stage performs prediction compensation on the compressed image data of a first pixel of the first group at a first time to generate first prediction data, and performs the prediction compensation on the compressed image data of a second pixel of the first group at a second time using the first prediction data. The second stage performs the prediction compensation on the compressed image data of a first pixel of the second group at the second time using the first prediction data, to generate second prediction data.

17 Claims, 9 Drawing Sheets

(51) Int. Cl.
*H04N 19/182* (2014.01)
*H04N 19/124* (2014.01)

(56) References Cited

U.S. PATENT DOCUMENTS

| | | | |
|---|---|---|---|
| 8,670,613 B2 | 3/2014 | McAllister et al. | |
| 9,014,495 B2 | 4/2015 | Cho et al. | |
| 9,363,527 B2 | 6/2016 | Iwata et al. | |
| 9,774,872 B2 | 9/2017 | Minezawa et al. | |
| 2004/0095996 A1 | 5/2004 | Mossakowski | |
| 2008/0219576 A1 | 9/2008 | Jung et al. | |
| 2012/0300838 A1 | 11/2012 | Ma et al. | |
| 2013/0343457 A1 | 12/2013 | Mrak et al. | |
| 2015/0220282 A1 | 8/2015 | Tsuda et al. | |
| 2016/0029027 A1 | 1/2016 | Katamaneni et al. | |
| 2016/0029043 A1* | 1/2016 | Chen | H04N 19/593 375/240.12 |
| 2016/0044308 A1 | 2/2016 | Jacobson et al. | |
| 2016/0198154 A1 | 7/2016 | Hsiang | |
| 2016/0323597 A1 | 11/2016 | Takehara et al. | |
| 2017/0150186 A1* | 5/2017 | Zhang | H04N 19/625 |
| 2017/0295378 A1* | 10/2017 | Que | H04N 19/176 |
| 2019/0238832 A1 | 8/2019 | Jun et al. | |

FOREIGN PATENT DOCUMENTS

| | | |
|---|---|---|
| CN | 105556962 | 5/2016 |
| CN | 105898305 | 8/2016 |
| KR | 10-2017-0023484 | 3/2017 |
| WO | 2017034311 | 3/2017 |

OTHER PUBLICATIONS

Office Action dated Jul. 10, 2020 in Corresponding U.S. Appl. No. 16/252,796.
CN 1st Office Action dated Jan. 28, 2022 in corresponding CN Application No. 201910075046.2.
TW 1st Office Action dated Jan. 18, 2022 in corresponding TW Application No. 107143902.
Rafael C. Gonzalez, Richard E. Woods, Digital Image Processing, 3rd Edition, PEARSON, 2008.

* cited by examiner

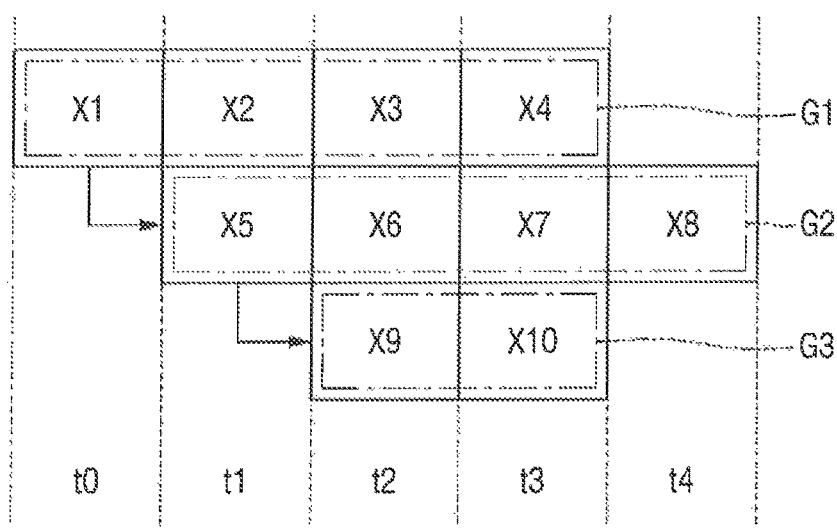

FIG. 9

| X11 | X12 | X13 | X14 | —G4 |
| X15 | X16 | X17 | X18 | —G5 |
| X19 | X20 |     |     | —G6 |
| t0  | t1  | t2  | t3  |     |

| ctx | 0 | 1 | 2 | 3 | 4 | 5 | 6 | 7 | 8 | 9 | 10 | 11 | 12 | 13 | 14 | 15 | ... | 31 |
|---|---|---|---|---|---|---|---|---|---|---|---|---|---|---|---|---|---|---|
| ctx Pred Look Up Luma[32] = { | 0 | 1 | 0 | 0 | 0 | 0 | 5 | 0 | 0 | 5 | 0 | 0 | 0 | 0 | 1 | 0 | ... | 3 } |
| ctx Pred Look Up Chroma[32] = { | 0 | 3 | 1 | 0 | 0 | 0 | 2 | 0 | 3 | 2 | 0 | 0 | 5 | 4 | 3 | 0 | ... | 3 } |

211c $Xp0 = (X11+X2) >> 1;$
$Xp1 = X2+(X11-X1) >> 1;$
$Xp2 = X2;$
$Xp3 = X11;$
$Xp4 = X11+(X2-X1);$
$Xp5 = X11+(X2-X1) >> 1;$
$r = X-Xp;$

IMAGE PROCESSING DEVICE

CROSS-REFERENCE TO RELATED APPLICATIONS

This application is a continuation of U.S. patent application Ser. No. 16/252,796 filed Jan. 21, 2019, which claims the benefit of priority under 35 U.S.C. 119 to Korean Patent Application No. 10-2018-0010162, filed on Jan. 26, 2018, and Korean Patent Application No. 10-2018-0041788, filed on Apr. 10, 2018, in the Korean Intellectual Property Office, the disclosures of which are incorporated by reference in their entireties herein.

BACKGROUND

1. Technical Field

The present disclosure relates to an image processing device.

2. Discussion of Related Art

More and more applications demand high-resolution video images and high-frame rate images. Accordingly, the amount of data accesses from a memory (i.e., bandwidth) storing these images by various multimedia intellectual property (IP) blocks of image processing devices has greatly increased.

Each image processing device has limited processing capability. When the bandwidth increases, the processing capability of the image processing device may reach this limit. Accordingly, a user of the image processing device may experience a decrease in speed while recording or playing a video image.

SUMMARY

At least one embodiment of the present inventive concept provides an image processing device having improved processing speed.

According to an exemplary embodiment of the present inventive concept, there is provided an image processing device for performing a data decompression. The image processing device includes a decoder circuit having a plurality of stages for decompressing first compressed image data of a plurality of pixels to original image data. The stages include at least first and second stages. The decoder circuit is configured to divide the pixels into a plurality of groups comprising at least first and second groups that are adjacent one another. The first stage performs prediction compensation on the first compressed image data of a first pixel of the first group at a first time to generate first prediction data, and performs the prediction compensation on the first compressed image data of a second pixel of the first group at a second time using the first prediction data. The second stage performs the prediction compensation on the first compressed image data of a first pixel of the second group at the second time using the first prediction data, to generate second prediction data.

According to an exemplary embodiment of the present inventive concept, there is provided a method of decompressing first compressed image data of a plurality of pixels to original image data. The method includes: dividing the pixels into a plurality of groups comprising at least first and second groups that are adjacent one another; performing prediction compensation on the first compressed image data of a first pixel of the first group at a first time to generate first prediction data; performing the prediction compensation on the first compressed image data of a second pixel of the first group at a second time using the first prediction data; and performing the prediction compensation on the first compressed image data of a first pixel of the second group at the second time using the first prediction data, to generate second prediction data.

According to an exemplary embodiment of the present inventive concept, there is provided an image processing device for performing a data compression. The device includes an encoder circuit having a plurality of stages for compressing original image data of a plurality of pixels to first compressed image data. The stages include at least first and second stages. The encoder circuit is configured to divide the pixels into a plurality of groups comprising at least first and second groups that are adjacent one another. The first stage processes the original image data of a first pixel of the first group at a first time to generate first prediction data, and processes the original image data of a second pixel of the first group and the first prediction data at a second time to generate first residual data. The first compressed image data includes the first prediction data, the first residual data, and the second residual data.

According to an exemplary embodiment of the present inventive concept, there is provided a method of compressing original image data of a plurality of pixels. The method includes: dividing the pixels into a plurality of groups comprising at least first and second groups that are adjacent one another; processing the original image data of a first pixel of the first group at a first time to generate first prediction data; processing the original image data of a second pixel of the first group and the first prediction data at a second time to generate first residual data; processing the original image data of a first pixel of the second group and the first prediction data at the second time to generate to generate second residual data; and generating compressed image data including the first prediction data, the first residual data, and the second residual data.

BRIEF DESCRIPTION OF THE DRAWINGS

The present invention will become apparent by describing in detail exemplary embodiments thereof with reference to the accompanying drawings in which:

FIG. 7 illustrates, in a time-series manner, the order in which prediction compensation is performed on the pixels of FIG. 6;

FIG. 8 illustrates pixels in a row other than the top row to explain the prediction of the image processing device according to an exemplary embodiment of the inventive concept:

FIG. 9 illustrates, in a time-series manner, the order in which prediction compensation is performed on the pixels of FIG. 8;

FIG. 10 illustrates pixels in a row other than a top row to explain the prediction of an image processing device according to exemplary embodiment of the inventive concept;

FIG. 11 illustrates the arrangement of pixels to explain prediction performed within a group by an image processing device according to an exemplary embodiment of the inventive concept;

DETAILED DESCRIPTION

An image processing device according to an exemplary embodiment of the inventive concept will now be described with reference to FIGS. 1 through 9.

Figure 1:
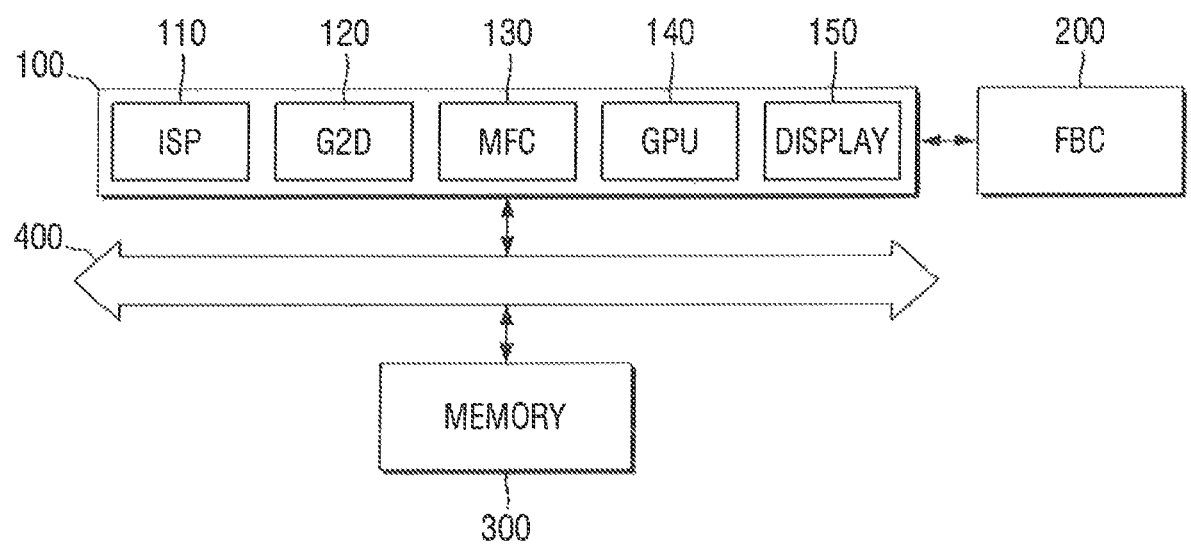
FIG. 1 is a block diagram of an image processing device according to an exemplary embodiment of the inventive concept.

FIG. 1 is a block diagram of an image processing device according to embodiments.

Referring to FIG. 1, the image processing device according to the embodiments includes a multimedia intellectual property (IP) 100 (e.g., an IP core, and IP block, a circuit, etc.), a frame buffer compressor (FBC) 200 (e.g., a circuit, a digital signal processor, etc.), a memory 300, and a system bus 400.

In an exemplary embodiment, the multimedia IP 100 is part of the image processing device that directly executes the image processing of the image processing device. The multimedia IP 100 may include a plurality of modules for performing image recording and reproduction such as camcording, playback, etc. of video images.

The multimedia IP 100 receives first data (e.g., image data) from an external device such as a camera and converts the first data into second data. For example, the first data may be raw moving image data or raw static image data. The second data may be data generated by the multimedia IP 100 and may also include data resulting from the multimedia IP 100 processing the first data. The multimedia IP 100 may repeatedly store the second data in the memory 300 and update the second data through various steps. The second data may include all of the data used in these steps. The second data may be stored in the memory 300 in the form of third data. Therefore, the second data may be data before being stored in the memory 300 or after being read from the memory 300.

In an exemplary embodiment, the multimedia IP 100 includes an image signal processor (ISP) 110, a shake correction module (G2D) 120, a multi-format codec (MFC) 130, a graphics processing unit (GPU) 140, and a display 150. However, the present inventive concept is not limited to this case. That is, the multimedia IP 100 can include at least one of the ISP 110, the G2D 120, the MFC 130, the GPU 140, and the display 150 described above. In other words, the multimedia IP 100 may be implemented by a processing module that has to access the memory 300 in order to process data representing a moving image or a static image.

The ISP 110 receives the first data and converts the first data into the second data by pre-processing the first data. In an embodiment, the first data is image source data in an RGB format. For example, the ISP 110 may convert the first data in the RGB format into the second data in a YUV format.

The RGB format refers to a data format in which colors are represented based on three primary colors of light. That is, an image is represented using three kinds of colors, i.e., red, green, and blue. On the other hand, the YUV format refers to a data format in which brightness, i.e., a luma signal and a chroma signal are represented separately. That is. Y denotes a luma signal, and U(Cb) and V(Cr) denote chroma signals, respectively. U denotes a difference between the luma signal and a blue signal component, and V denotes a difference between the luma signal and a red signal component.

Data in the YUV format may be obtained by converting the RGB type data using a conversion formula. For example, a conversion formula such as Y=0.3R+0.59G+0.11B, U=(B−Y)×0.493, V=(R−Y)×0.877 may be used to convert the RGB type data into the YUV type data.

Since the human eye is sensitive to luma signals but less sensitive to color signals, it may be easier to compress data in the YUV format than to compress data in the RGB format. Therefore, the ISP 110 may convert the first data in the RGB format into the second data in the YUV format.

After the ISP 110 converts the first data into the second data, it stores the second data in the memory 300.

The G2D 120 may perform shake correction of static image data or moving image data. The G2D 120 may read the first data or the second data stored in the memory 300 to perform shake correction. In an embodiment, the shake correction refers to detecting shakes of a camera in moving image data and removing the shakes from the moving image data.

The G2D 120 may generate new second data or update the second data by correcting shakes in the first data or the second data and may store the generated or updated second data in the memory 300.

The MFC 130 may be a codec for compressing moving image data. Generally, moving image data is very large in size. Therefore, a compression module for reducing the size of the moving image data is needed. The moving image data may be compressed based on the associative relationship between a plurality of frames, and this compression may be performed by the MFC 130. The MFC 130 may read and compress the first data or may read and compress the second data stored in the memory 300.

The MFC 130 may generate new second data or update the second data by compressing the first data or the second data and store the new second data or the updated second data in the memory 300.

The GPU 140 may perform an arithmetic process to calculate and generate two-dimensional or three-dimensional graphics. The GPU 140 may calculate the first data or calculate the second data stored in the memory 300. The GPU 140 may be specialized in processing graphics data and may process graphics data in parallel.

The GPU 140 may generate new second data or update the second data by compressing the first data or the second data and store the new second data or the updated second data in the memory 300.

The display 150 may display the second data stored in the memory 300 on a screen. The display 150 may display image data. i.e., the second data processed by other components of the multimedia IP 100, that is, the ISP 110, the G2D 120, the MFC 130 and the GPU 140, on the screen. However, the present inventive concept is not limited to this case.

Each of the ISP 110, the G2D 120, the MFC 130, the GPU 140 and the display 150 of the multimedia IP 100 may operate individually. That is, each of the ISP 110, the G2D 120, the MFC 130, the GPU 140, and the display 150 may individually access the memory 300 to write or read data.

In an embodiment, the FBC 200 converts the second data into the third data by compressing the second data before the elements of the multimedia IP 100 access the memory 300 individually. The FBC 200 may transmit the third data to the multimedia IP 100, and the multimedia IP 100 may transmit the third data to the memory 300.

Therefore, the third data generated by the FBC 200 may be stored in the memory 300. Conversely, the third data stored in the memory 300 may be loaded by the multimedia IP 100 and transmitted to the FBC 200. The FBC 200 may convert the third data into the second data by decompressing the third data. The FBC 200 may transmit the second data to the multimedia IP 100.

That is, whenever the ISP 110, the G2D 120, the MFC 130, the GPU 140 and the display 150 of the multimedia IP 100 access the memory 300 individually, the FBC 200 may compress the second data into the third data and transmit the third data to the memory 300. For example, after one of the components of the multimedia IP 100 generates and stores the second data in the memory 300, the frame buffer compressor 200 can compress the stored data and store the compressed data into the memory 300. Conversely, whenever a data request is made from the memory 300 to the ISP 110, the G2D 120, the MFC 130, the GPU 140 and the display 150 of the multimedia IP 100, the FBC 200 may decompress the third data into the second data and transmit the second data to each of the ISP 110, the G2D 120, the MFC 130, the GPU 140 and the display 150 of the multimedia IP 100.

The memory 300 may store the third data generated by the FBC 200 and provide the stored third data to the FBC 200 so that the FBC 200 can decompress the third data.

In an embodiment, the system bus 400 is connected to each of the multimedia IP 100 and the memory 300. Specifically, the ISP 110, the G2D 120, the MFC 130, the GPU 140 and the display 150 of the multimedia IP 100 may be individually connected to the system bus 400. The system bus 400 may serve as a path through which the ISP 110, the G2D 120, the MFC 130, the GPU 140 and the display 150 of the multimedia IP 100 and the memory 300 exchange data with each other.

In an embodiment, the FBC 200 is not connected to the system bus 400 and converts the second data into the third data or the third data into the second data when each of the ISP 110, the G2D 120, the MFC 130, the GPU 140 and the display 150 of the multimedia IP 100 accesses the memory 300.

Figure 2:
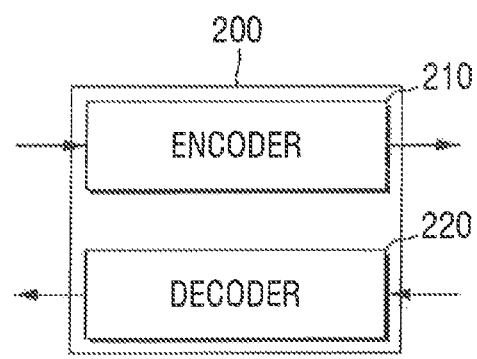
FIG. 2 is a detailed block diagram of a frame buffer compressor (FBC) illustrated in FIG. 1.

FIG. 2 is a detailed block diagram of the FBC 200 illustrated in FIG. 1.

Referring to FIG. 2, the FBC 200 includes an encoder 210 (e.g., an encoding circuit) and a decoder 220 (e.g., a decoding circuit).

The encoder 210 may receive the second data from the multimedia IP 100 and generate the third data. Here, the second data may be transmitted from each of the ISP 110, the G2D 120, the MFC 130, the GPU 140 and the display 150 of the multimedia IP 100. The third data may be transmitted to the memory 300 through the multimedia IP 100 and the system bus 400.

Conversely, the decoder 220 may decompress the third data stored in the memory 300 into the second data. The second data may be transmitted to the multimedia IP 100. Here, the second data may be transmitted to each of the ISP 110, the G2D 120, the MFC 130, the GPU 140 and the display 150 of the multimedia IP 100.

Figure 3:
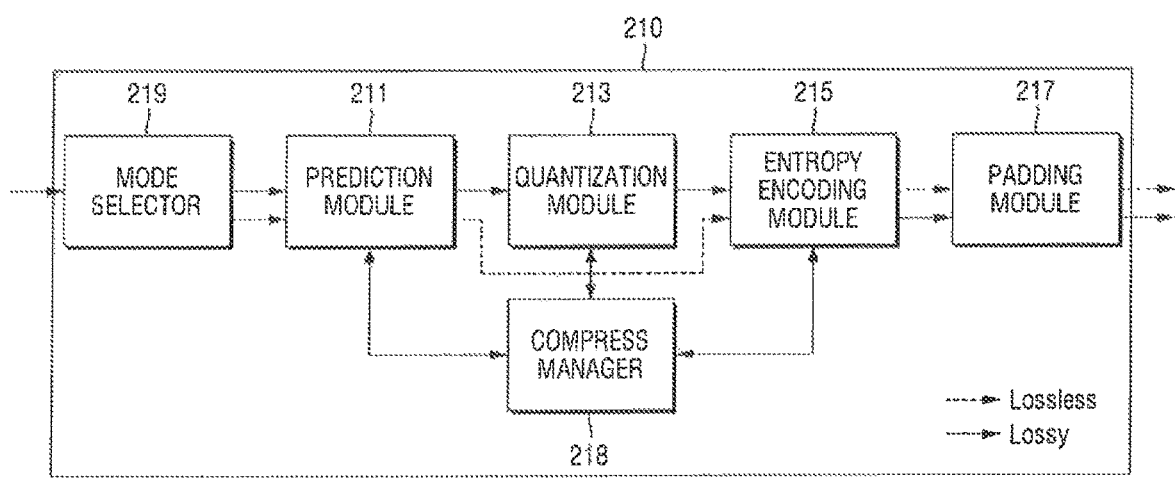
FIG. 3 is a detailed block diagram of an encoder illustrated in FIG. 2.

FIG. 3 is a detailed block diagram of the encoder 210 illustrated in FIG. 2.

Referring to FIG. 3, the encoder 210 includes a rust mode selector 219 (e.g., a mode selection circuit), a prediction module 211 (e.g., a logic circuit), a quantization module 213 (e.g., a logic circuit), an entropy encoding module 215 (e.g., a logic circuit), and a padding module 217 (e.g., a logic circuit).

In an embodiment, the first mode selector 219 determines whether the encoder 210 will operate in a lossless mode (e.g., lossless compression) or a lossy mode (e.g., lossy compression). When the encoder 210 operates in the lossless mode based on the determination result of the first mode selector 219, the second data may be compressed along a lossless path of FIG. 3. When the encoder 210 operates in the lossy mode, the second data may be compressed along a lossy path.

The first mode selector 219 may receive a signal from the multimedia IP 100 used to determine whether lossless compression or lossy compression will be performed. Here, the lossless compression denotes compression without loss of data and has a compression ratio that varies depending on data. On the other hand, the lossy compression denotes compression in which data is partially lost. The lossy compression has a higher compression ratio than the lossless compression and has a preset fixed compression ratio.

In the case of the lossless mode, the first mode selector 219 enables the second data to flow to the prediction module 211, the entropy encoding module 215 and the padding module 217 along the lossless path. Conversely, in the case of the lossy mode, the first mode selector 219 enables the second data to flow to the prediction module 211, the quantization module 213 and the entropy encoding module 215 along the lossy path.

The prediction module 211 converts the second data into predicted image data. The predicted image data is a compressed representation of the second data as a combination of prediction data and residual data. In an embodiment, the prediction data is image data of one pixel of the image data and the residual data is created from the differences between the prediction data and the image data of the pixels of the image data that are adjacent the one pixel. For example, if the image data of the one pixel has a value of 0 to 255, 8 bits may be needed to represent the value. When the adjacent pixels have similar values to that of the one pixel, the residual data of each of the adjacent pixels is much smaller than the prediction data. For example, if an adjacent pixel has a similar value, only a difference (i.e., a residual) from the value of the adjacent pixel can be represented without loss of data, and the number of bits of data needed to represent the difference may be much smaller than 8 bits. For example, when pixels having values of 253, 254 and 255 are arranged successively, if prediction data is 253, a residual data representation of (253(prediction), 1(residual), 2(residual)) may be sufficient, and the number of bits per pixel needed for this residual data representation may be 2 bits which is much smaller than 8 bits. For example, 24 bits of data of 253, 254, and 255 can be reduced to 12 bits due to 8 bit prediction data of 253 (11111101), 2 bit residual data of 254−251=1 (01), and 2 bit residual data of 255−253=2 (10).

The prediction module 211 may compress the overall size of the second data by dividing the second data into prediction data and residual data. Various methods can be used to determine the prediction data. Specific prediction methods will be described in more detail later.

The prediction module 211 may perform prediction on a pixel-by-pixel basis or on a block-by-block basis. Here, a block may be an area formed by a plurality of adjacent pixels. For example, prediction on a pixel basis could mean that all the residual data is created from one of the pixels, and prediction on the block basis could mean that residual data is created for each block from a pixel of the corresponding block.

The quantization module 213 may further compress the predicted image data into which the second data has been compressed by the prediction module 211. The quantization module 213 may remove lower bits of the predicted image data using a preset quantization parameter (QP). For example, if the prediction data is 253 (11111101), the prediction data can be reduced from 8 bits to 6 bits by removing the lower 2 bits, which results in prediction data of 252 (111111). Specifically, a representative value may be selected by multiplying the data by a QP, where numbers below a decimal point are discarded, thus causing a loss. If pixel data has a value of 0 to $2^8-1$ (=255), the QP may be defined as $1/(2^n-1)$ (where n is an integer of 8 or less). However, the current embodiments are not limited to this case.

Here, since the removed lower bits are not restored later, they are lost. Therefore, the quantization module 213 is utilized only in the lossy mode. The lossy mode may have a relatively higher compression ratio than the lossless mode and may have a preset fixed compression ratio. Therefore, information about the compression ratio is not needed later.

The entropy encoding module 215 may compress, through entropy coding, the predicted image data compressed by the quantization module 213 in the lossy mode or the predicted image data into which the second data has been compressed by the prediction module 211 in the lossless mode. In the entropy coding, the number of bits may be allocated according to frequency.

In an embodiment, the entropy encoding module 215 compresses the predicted image data using Huffman coding. In an alternative embodiment, the entropy encoding module 215 compresses the predicted image data through exponential Golomb coding or Golomb rice coding. In an embodiment, the entropy encoding module 215 generates a table using k values, and compresses the predicted image data using the generated table. The k values may be entropy encoding/coding values using in the entropy encoding.

The padding module 217 may perform padding on the predicted image data compressed by the entropy encoding module 215 in the lossless mode. Here, the padding may refer to adding meaningless data in order to fit a specific size.

The padding module 217 may be activated not only in the lossless mode but also in the lossy mode. In the lossy mode, the predicted image data may be compressed by the quantization module 213 more than an intended compression ratio. In this case, the predicted image data may be passed through the padding module 217 even in the lossy mode, converted into the third data and then transmitted to the memory 300. In an exemplary embodiment, the padding module 217 is omitted so that no padding is performed.

A compress manager 218 determines a combination of a QP table and an entropy table used for quantization and entropy coding, respectively, and controls the compression of the second data according to the determined combination of the QP table and the entropy table.

In this case, the first mode selector 219 determines that the encoder 210 will operate in the lossy mode. Accordingly, the second data is compressed along the lossy path of FIG. 3. That is, the compress manager 218 determines that a combination of a QP table and an entropy table is needed and compresses the second data according to the determined combination of the QP table and the entropy table based on the premise that the FBC 200 compresses the second data using a lossy compression algorithm.

Specifically, the QP table may include one or more entries, and each of the entries may include a QP used to quantize the second data.

In an embodiment, the entropy table refers to a plurality of code tables identified by k values to perform an entropy coding algorithm. The entropy table that can be used in some embodiments may include at least one of an exponential Golomb code and a Golomb rice code.

The compress manager 218 determines a QP table including a predetermined number of entries, and the FBC 200 quantizes the predicted second data using the determined QP table. In addition, the compress manager 218 determines an entropy table using a predetermined number of k values, and the FBC 200 performs entropy coding on the quantized second data using the determined entropy table. That is, the FBC 200 generates the third data based on a combination of a QP table and an entropy table determined by the compress manager 218.

Then, the FBC 200 may write the generated third data into the memory 300. In addition, the FBC 200 may read the third data from the memory 300, decompress the read third data, and provide the decompressed third data to the multimedia IP 100.

Figure 4:
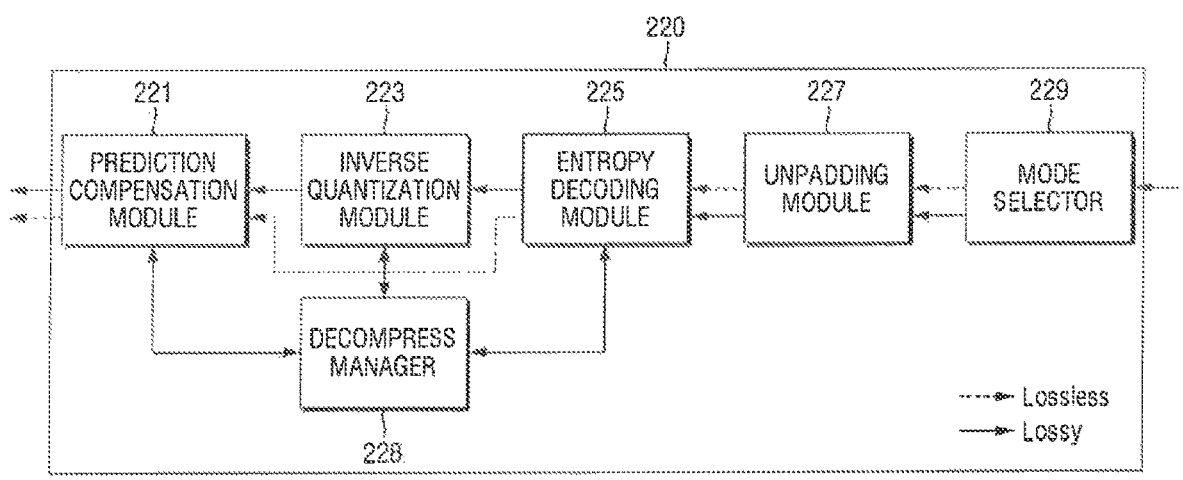
FIG. 4 is a detailed block diagram of a decoder illustrated in FIG. 2.

FIG. 4 is a detailed block diagram of the decoder 220 illustrated in FIG. 2.

Referring to FIGS. 3 and 4, the decoder 220 includes a second mode selector 229 (e.g., logic circuit), an unpadding module 227 (e.g., logic circuit), an entropy decoding module 225 (e.g., logic circuit), an inverse quantization module 223 (e.g., logic circuit), and a prediction compensation module 221 (e.g., logic circuit).

The second mode selector 229 determines whether the third data stored in the memory 300 has been generated through lossless compression or lossy compression of the second data. In an exemplary embodiment, the second mode selector 229 determines whether the third data has been generated by compressing the second data in the lossless mode or the lossy mode based on the presence or absence of a header.

If the third data has been generated by compressing the second data in the lossless mode, the second mode selector 229 enables the third data to flow to the unpadding module 227, the entropy decoding module 225 and the prediction compensation module 221 along a lossless path. Conversely, if the third data has been generated by compressing the second data in the lossy mode, the second mode selector 229 enables the third data to flow to the entropy decoding module 225, the inverse quantization module 223 and the prediction compensation module 221 along a lossy path.

The unpadding module 227 may remove a portion of data which has been padded by the padding module 217 of the encoder 210. The unpadding module 227 may be omitted when the padding module 217 is omitted.

The entropy decoding module 225 may decompress data which has been compressed by the entropy encoding module 215. The entropy decoding module 225 may perform decompression using Huffman coding, exponential Golomb coding, or Golomb rice coding. Since the third data includes k values, the entropy decoding module 225 may perform decoding using the k values.

The inverse quantization module 223 may decompress data which has been compressed by the quantization module 213. The inverse quantization module 223 may restore the second data compressed by the quantization module 213 using a predetermined quantization parameter (QP). For example, the inverse quantization module 223 may perform an inverse quantization operation on the output of the entropy decoding module 225. However, the inverse quantization module 223 cannot completely recover the data lost in the compression process. Therefore, the inverse quantization module 223 is utilized only in the lossy mode.

The prediction compensation module 221 may perform prediction compensation to recover data represented as prediction data and residual data by the prediction module 211. For example, the prediction compensation module 221 may convert a residual data representation of (253(prediction), 1(residual), 2(residual)) into (253, 254, 255). For example, the prediction compensation module 221 may restore the data by adding the residual data to the prediction data. Specific prediction compensation methods will be described in more detail later.

The prediction compensation module 221 may restore data predicted on a pixel-by-pixel basis or a block-by-block basis by the prediction module 211. Accordingly, the second data may be restored or the third data may be decompressed and then transmitted to the multimedia IP 100.

A decompress manager 228 may perform an operation to appropriately reflect a combination of a QP table and an entropy table, which has been determined by the compress manager 218 to compress the second data as described above with reference to FIG. 3, in the decompression of the third data.

When the prediction module 211 performs prediction on a pixel-by-pixel basis, the prediction compensation module 221 may also perform prediction compensation on a pixel-by-pixel basis. When prediction and prediction compensation are performed on a pixel-by-pixel basis, there is no dependency between blocks. Therefore, random access of the multimedia IP 100 is possible. Here, the random access may refer to directly accessing a necessary block instead of sequentially accessing blocks from a first block.

Figures 5, 6:
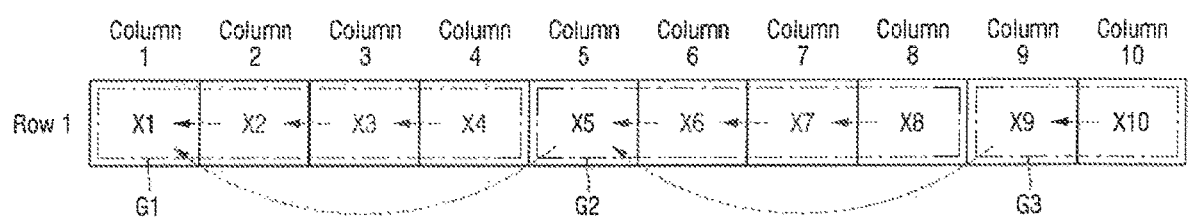
FIG. 5 illustrates the arrangement of pixels of image data of the image processing device according to the embodiments.
FIG. 6 illustrates pixels in a top row to explain the prediction of the image processing device according to the embodiments.

FIG. 5 illustrates the arrangement of pixels of image data of the image processing device according to an exemplary embodiment of the inventive concept.

Referring to FIG. 5, the prediction module 211 of the encoder 210 of the FBC 200 of the image processing device according to an exemplary embodiment receives the second data (e.g., image data). The prediction module 211 converts the image data into predicted image data (e.g., prediction data and residual data). The arrangement of the predicted image data may be the same as the arrangement of the image data. However, unlike the image data, values of the predicted image data may be reduced to residual data and displayed accordingly.

Here, the image data may be composed of a plurality of pixels arranged in a plurality of rows and a plurality of columns. As illustrated in FIG. 5, the image data may include a plurality of rows Row 1 through Row 10 and a plurality of columns Column1 through Column10. Although ten rows Row 1 through Row 10 and ten columns Column 1 through Column 10 are illustrated in FIG. 5, the current embodiments are not limited to this case.

That is, the number of rows and columns in which pixels are arranged in the image data of the image processing device according to the embodiments can vary.

The rows Row 1 through Row 10 may include first through tenth rows Row 1 through Row10. Here, the first row Row 1 is a top row, and the tenth row Row 10 is a bottom row. That is, the second through tenth rows Row 2 through Row 10 may be sequentially arranged below the first row Row 1.

The columns Column 1 through Column 10 may include first through tenth columns Column 1 through Column 10. Here, the first column Column 1 may be a leftmost column, and the tenth column Column 10 may be a rightmost column. That is, the second through tenth columns Column 2 through Column 10 may be sequentially arranged on a right side of the first column Column 1.

FIG. 6 illustrates pixels in the top row to explain the prediction performed by the image processing device according to an exemplary embodiment of the inventive concept.

Referring to FIGS. 3 through 5 and 6, when performing prediction on a pixel-by-pixel basis, the prediction module 211 sequentially performs prediction in a downward direction from the first row Row 1 to the tenth row Row 10. However, the current embodiments are not limited to this case, and the image processing device according to at least one of the embodiments can perform prediction on a row-by-row basis but in a different order. For ease of description, it will be assumed that the prediction module 211 performs prediction on a row-by-row basis in the downward direction.

Likewise, when performing prediction compensation on a pixel-by-pixel basis, the prediction compensation module 221 may sequentially perform prediction compensation in the downward direction from the first row Row 1 to the tenth row Row 10. However, the current embodiments are not limited to this case, and the image processing device according to at least one of the embodiments can perform prediction compensation on a row-by-row basis, but in a different order. For ease of description, it will be assumed that the prediction module 211 performs prediction compensation on a row-by-row basis in the downward direction.

The first row Row 1 may include first through tenth pixels X1 through X10 arranged sequentially from the left. That is, the first pixel X1 may be located on a leftmost side of the first row Row 1, and the second through tenth pixels X2 through X10 may be sequentially disposed on the right side of the first pixel X1.

In an exemplary embodiment, the prediction module 211 divides the first row Row 1 into a plurality of groups. Specifically, the first row Row 1 may include a first group G1, a second group G2, and a third group G3. Here, the first group G1 and the second group G2 each include four pixels. The third group G3 includes two pixels since the number of remaining pixels in the first row Row 1 is only two.

The number of pixels in each group may be a preset value. The number of pixels in all groups may be the same, except for a group having an insufficient number of pixels as in the third group G3. In FIG. 6, the number of pixels in each group is four. However, this is merely an example, and the number of pixels in each group can vary. However, the number of pixels in each group should be less than or equal to the total number of pixels in the first row Row 1 (e.g., 10).

In an embodiment, the prediction module 211 sets prediction data of the first pixel X1 to half of the bit depth. However, the current embodiments are not limited to this case. For example, if the bit depth is 8 bits, half of the bit depth would be 128. Thus, if the first pixel X1 is 253, and the prediction data is 128, then the residual data would be 253−128=125.

The prediction performed by the prediction module 211 refers to dividing a data value of a pixel into prediction data and residual data. That is, the prediction module 211 may perform a prediction on the first pixel X1 by obtaining prediction data of the first pixel X1 and setting a difference between a data value of the first pixel X1 and the prediction data as residual data.

Similarly, the prediction compensation performed by the prediction compensation module 221 may refer to obtaining the original pixel value, that is, a data value included in a pixel by using prediction data and residual data. For example, the original pixel value can be obtained by adding the residual data to the prediction data.

Basically, the purpose of performing prediction is to represent a data value with fewer bits using a similar, neighboring data value. However, since the first pixel X1 is a pixel for which a neighboring value cannot be used because it is a first pixel to be predicted, half of the bit depth may be used as the prediction data.

Then, the prediction module 211 may perform prediction on the second pixel X2. The prediction module 211 obtains prediction data and residual data by using the value of the first pixel X1 as the prediction data in the prediction of the second pixel X2. For example, if the first pixel X1 is 253 and the second pixel X2 is 254, then the prediction data for the second pixel X2 is 253 and residual data for the second pixel X2 is 254−253=1. Similarly, the third pixel X3 uses the value of the second pixel X2 as prediction data, and the fourth pixel X4 uses the value of the third pixel X3 as prediction data.

That is, in the first group G1, the prediction module 211 may perform prediction using differential pulse-code modulation (DPCM) in which the value of a left pixel is used as prediction data as described above.

When performing prediction of the second group G2, the prediction module 211 uses the data value of the first pixel X1, which is the first pixel of the first group G1, as prediction data of the fifth pixel X5. Likewise, the prediction module 211 uses the value of the fifth pixel X5, which is the first pixel of the second group G2, as prediction data of the ninth pixel X9 of the third group G3.

That is, within each group, the prediction module 211 may use the DPCM, in other words, uses the value of an immediately left pixel as prediction data. However, as for the first pixel of each group, the prediction module 211 uses the value of the first pixel of a previous group as prediction data.

This is related to the fact that the prediction compensation of the prediction compensation module 221 is performed in a sequential manner. If the prediction module 211 does not perform grouping and uses the value of an immediately left pixel as prediction data of each pixel except for the first pixel X1 of the first row Row 1, the prediction compensation module 221 cannot obtain the value of the fifth pixel X5 until identifying the value of the fourth pixel X4 through prediction compensation.

In this case, the prediction compensation module 221 can perform prediction compensation only sequentially from the first pixel X1 to the tenth pixel X10. However, since the prediction module 211 and the prediction compensation module 221 according to an exemplary embodiment of the inventive concept is capable of parallel processing. If sequential prediction compensation can be performed in parallel, faster prediction compensation is possible.

The prediction module 211 of the image processing device according to an exemplary embodiment of the inventive concept does not need to wait until prediction compensation on the pixels of the first group G1 is finished in order to perform prediction on the pixels of the second group G2. In an exemplary embodiment, the FBC 200 or more specifically the prediction compensation module 221 includes multiple circuits or processors (e.g., pipeline stages), where each circuit/processor performs independent prediction compensation, and the operation of these circuits are staggered. For example, a first one of these circuits/processors (e.g., a first stage of a pipeline) begins performing prediction compensation on the first group G1, and then after the first circuit has finished processing the first pixel X1 of the first group G1, the second circuit (e.g., a second stage of the pipeline) begins performing prediction compensation on the second group G2. The processing of the first pixel X1 by the first circuit may include adding residual data of the first pixel X1 to the prediction data generated from the one-half bit depth to determine the original data of the first pixel X1 and passing the original data of the first pixel to the second circuit as prediction data to be used in the second circuit's generation of the original data of the fifth pixel X5. Then, the second circuit/processor can generate the original data of the fifth pixel X5 by adding the residual data of the fifth pixel X5 to the received prediction data.

FIG. 7 illustrates, in a time-series manner, the order in which prediction compensation is performed on the pixels of FIG. 6.

Referring to FIG. 7, the prediction compensation module 221 performs prediction compensation on the first pixel X1 at a first time t0. Here, since the first pixel X1 has half of the bit depth as prediction data as described above, the prediction compensation may be performed regardless of the values of other pixels.

The prediction compensation module 221 obtains the value of the second pixel X2 of the first group G1 by performing prediction compensation on the second pixel X2 using the value of the first pixel X1 obtained through the prediction compensation on the first pixel PX1. That is, since the value of the second pixel X2 uses the value of the first pixel X1 as prediction data, it may be obtained as the sum of residual data and the prediction data. The prediction compensation module 221 obtains the value of the second pixel X2 at a second time t1.

The prediction compensation module 221 also obtains the value of the fifth pixel X5 of the second group G2 through prediction compensation. This is because the fifth pixel X5 also uses the value of the first pixel X1 as prediction data. Therefore, it is possible to immediately perform prediction compensation on the fifth pixel X5 of the second group G2 at the second time t1 without the need to wait until prediction compensation on all pixels of the first group G1 have finished. For example, a first stage of a pipeline can operate on the first pixel X1 at time t0 to generate the original data of the first pixel to be used as first prediction data for the second pixel X1 and the fifth pixel X5, and then a second stage of the pipeline can operate on the fifth pixel X5 at time 1 since the first stage generated the first prediction data it needs for generating the original data of the fifth pixel X5 at time 0.

Similarly, the prediction compensation module 221 may perform prediction compensation on the ninth pixel X9 of the third group G3 at a third time t2. Since the value of the fifth pixel X5 has already been obtained at the second time t1, the prediction compensation module 221 can obtain the value of the ninth pixel X9 using the value of the fifth pixel X5. For example, the second stage of the pipeline uses the first prediction data it received from the first pipeline to generate the original data of the fifth pixel at time t1 to be used as second prediction data for the third pixel X3 and the ninth pixel X9, and then a third stage of the pipeline can operate on the ninth pixel X9 at time t2 since the second stage generated the second prediction data it needs for generating the original data of the ninth pixel X9. In an embodiment, the prediction compensation module 221 also performs prediction compensation on the third pixel X3 and the sixth pixel X6 in parallel.

That is, the prediction compensation module 221 of the image processing device according to an exemplary embodiment of the inventive concept can perform parallel prediction compensation because the prediction module 211 does not perform prediction on each group in a serial manner.

FIG. 8 illustrates pixels in a row other than the top row to explain the prediction of the image processing device according to embodiments of the inventive concept.

Referring to FIG. 8, the second row Row 2 includes eleventh through twentieth pixels X11 through X20 arranged sequentially from the left. That is, the eleventh pixel X11 is located on the leftmost side of the second row Row 2, and the twelfth through twentieth pixels X12 through X20 may be sequentially disposed on the right side of the eleventh pixel X11.

The prediction module 211 divides the second row Row 2 into a plurality of groups. Specifically, the second row Row 2 includes a fourth group G4, a fifth group G5, and a sixth group G6. Here, the fourth group G4 and the fifth group G5 each include four pixels. The sixth group G6 includes two pixels since the number of remaining pixels in the second row Row 2 is only two. The number of pixels in each group can vary.

The prediction module 211 performs prediction on the eleventh pixel X 11 which is a first pixel of the fourth group G4. In an embodiment of the inventive concept, the prediction of the eleventh pixel X11 is performed using the value of the first pixel X1 as prediction data. Since there is no pixel that can be referred to on the left side of the eleventh pixel X11 and a pixel closest to the eleventh pixel X11 is the first pixel X1 above the eleventh pixel X11, it may be efficient to use the value of the first pixel X1 as the prediction data.

Then, the prediction module 211 performs prediction on the twelfth pixel X12. The prediction module 211 may obtain prediction data and residual data by using the value of the eleventh pixel X 11 as the prediction data in the prediction of the twelfth pixel X12. Likewise, the thirteenth pixel X13 uses the value of the twelfth pixel X12 as prediction data, and the fourteenth pixel X14 uses the value of the thirteenth pixel X13 as prediction data. That is, in the fourth group G4, the prediction module 211 performs prediction using the DPCM in which the value of a left pixel is used as prediction data as described above.

Likewise, the prediction module 211 performs prediction on the fifteenth pixel X15, which is a first pixel of the fifth group G5, by using the value of the fifth pixel X5 located above the fifteenth pixel X15 as prediction data. This is not only efficient because the fifth pixel X5 is adjacent to the fifteenth pixel X15, but also intended for parallel execution of prediction compensation. Similarly, the prediction module 211 performs prediction on the nineteenth pixel X19, which is a first pixel of the sixth group G6, using the value of the ninth pixel X9 above the nineteenth pixel X19 as prediction data.

Prediction on other pixels in the fifth group G5 and the sixth group G6 may also be performed by the prediction module 211 using the DPCM.

FIG. 9 illustrates, in a time-series manner, the order in which prediction compensation is performed on the pixels of FIG. 8.

Referring to FIG. 9, the prediction compensation module 221 simultaneously performs prediction compensation on the eleventh pixel X11, the fifteenth pixel X15 and the nineteenth pixel X19 in parallel at a first time t0. Since the eleventh pixel X11, the fifteenth pixel X15 and the nineteenth pixel X19 in the second row Row 2 use the values of the pixels in the first row Row 1 as prediction data, prediction compensation on the eleventh pixel X 11, the fifteenth pixel X15 and the nineteenth pixel X19 can be performed immediately regardless of the values of other pixels in the second row Row 2. For example, a first stage of the prediction compensation module 221 may operate on pixel X11, a second stage of the prediction compensation module 221 may operate on pixel X15, and a third stage of the prediction compensation module 221 may operate on pixel X19, at the same time t0, assuming the data for pixels of the prior row was already previously decompressed. For example, decompression of the data of the prior row provides the value of pixel X1 used to generate first prediction data, the value of pixel X5 used to generate second prediction data, and the value of pixel X9 used to generate third prediction data, where the first prediction data is added to the residual data of pixel X 11 to restore the data of pixel X11, where the second prediction data is added to the residual data of pixel X15 to restore the data of pixel X15, and the third prediction data is added to the residual data of pixel X19 to restore the data of pixel X19.

Then, the prediction compensation module 221 sequentially performs prediction compensation on the pixels of the fourth group G4, the fifth group G5 and the sixth group G6 using the values of the eleventh pixel X 11, the fifteenth pixel X15 and the nineteenth pixel X19 obtained through the prediction compensation.

An image processing device according to at least one embodiment of the inventive concept will now be described with reference to FIGS. 1 through 4 and 10.

FIG. 10 illustrates pixels in a row other than a top row to explain the prediction of an image processing device according to an exemplary embodiment of the inventive concept.

Referring to FIGS. 1 through 4 and 10, a prediction module 211 of the image processing device according to an embodiment performs prediction on a first pixel of each group by considering at least one of an upper pixel, an upper left pixel and an upper right pixel.

Specifically, when the prediction module 211 performs prediction on a fifteenth pixel X15, it obtains prediction data using at least one of a fifth pixel X5 located above the fifteenth pixel X15, a fourth pixel X4 located on a left side of the fifth pixel X5, and a sixth pixel X6 located on a right side of the fifth pixel X5.

That is, the prediction data of the fifteenth pixel X15 may be any one of the values of the fourth pixel X4, the fifth pixel X5 and the sixth pixel X6, may be a value calculated using two of the values of the fourth pixel X4, the fifth pixel X5 and the sixth pixel X6, or may be a value calculated using all of the values of the fourth pixel X4, the fifth pixel X5 and the sixth pixel X6. For example, the prediction data can be generated by averaging the two values together or averaging the three values together.

Accordingly, for the fifteenth pixel X15, the prediction module 211 can obtain prediction data having higher efficiency by using more diverse sources. Likewise, prediction data of a nineteenth pixel X19 can be obtained in consideration of at least one of the values of an eighth pixel X8, a ninth pixel X9 and a tenth pixel X10. Similarly, prediction data of an eleventh pixel X11 may also be obtained in consideration of at least one of the values of a first pixel X1 and a second pixel X2. Here, since there is no pixel on the left side of the first pixel X1, only two pixels can be considered.

While there are various methods of performing prediction by considering a plurality of pixels, context prediction to be described later can also be used.

An image processing device according to an embodiment of the inventive concept will now be described with reference to FIGS. 1 through 4 and 11 through 16.

FIG. 11 illustrates the arrangement of pixels to explain prediction performed within a group by an image processing device according to an embodiment of the inventive concept.

Referring to FIGS. 1 through 4 and 11, a prediction module 211 of the image processing device according to an embodiment performs context prediction within a group. The context prediction is a method of generating a context using a plurality of neighboring pixels and determining prediction data based on the generated context.

Specifically, prediction and prediction compensation may be performed on a twelfth pixel X12 of a second row Row 2 using an eleventh pixel X11 which is a left pixel, a second pixel X2 which is an upper pixel, a first pixel X1 which is an upper left pixel, and a third pixel X3 which is an upper right pixel.

Since a prediction compensation module 221 sequentially performs prediction compensation in a downward direction from a first row Row1, when prediction compensation is performed on the twelfth pixel X12 of the second row Row 2, the values of all pixels of the first row Row 1 have already been obtained through prediction compensation. In addition, since the eleventh pixel X11 located on the left side of the twelfth pixel X12 in the second row Row 2 is a pixel within the same group as the twelfth pixel X12, the value of the eleventh pixel X11 may have already been obtained through prediction compensation.

On the other hand, since a thirteenth pixel X13 and a fourteenth pixel X14 located on the right side of the twelfth pixel X12 within the same group have not yet undergone prediction compensation, the values of the thirteenth pixel X13 and the fourteenth pixel X14 cannot be referred to in the prediction compensation of the twelfth pixel X12.

In an embodiment, the prediction module 211 include a branch statement 211a, a lookup table 211b, and a prediction equation 211c.

The branch statement 211a may receive the values of pixels to be referred to, that is, the values of the first pixel X1, the second pixel X2, the third pixel X3 and the eleventh pixel X11 in the case of the twelfth pixel X12. The branch statement 211a may generate a context ctx using the values of the first pixel X1, the second pixel X2, the third pixel X3 and the eleventh pixel X11. The branch statement 211a may transmit the context ctx to the lookup table 211b.

The lookup table 211b may receive the context ctx and output group information Gr. The group information Gr may be information that determines which equation included in the prediction equation 211c should be used.

The prediction equation 211c may receive the group information Gr and produce prediction data Xp and a residual r using an equation corresponding to the group information Gr.

Figure 12:
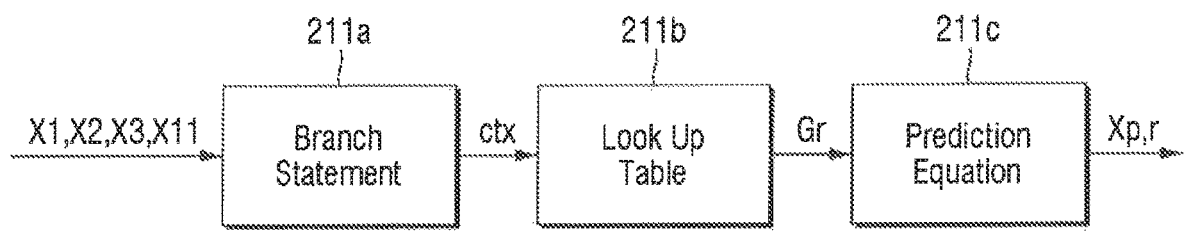
FIG. 12 is a detailed block diagram of a prediction module of the image processing device according to an exemplary embodiment of the inventive concept.
Figure 13:
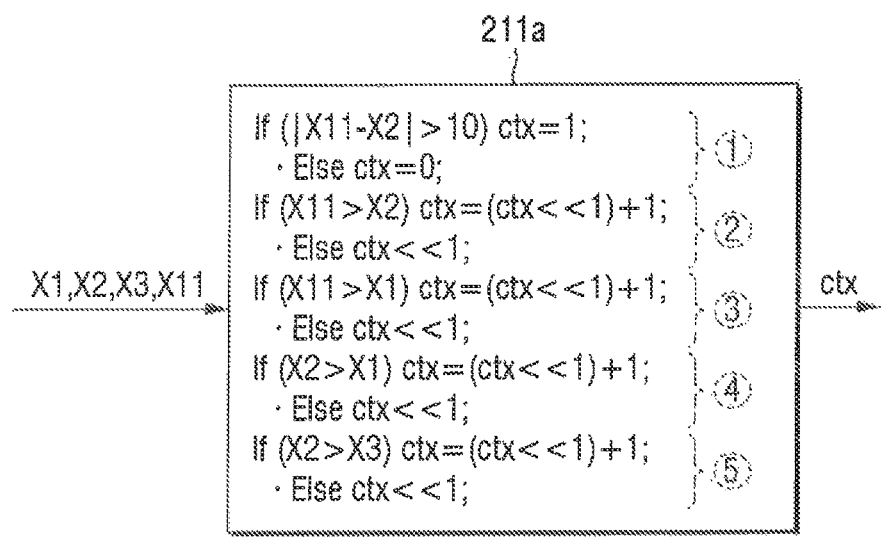
FIG. 13 is a detailed diagram of a branch statement illustrated in FIG. 12.
Figures 14, 15:
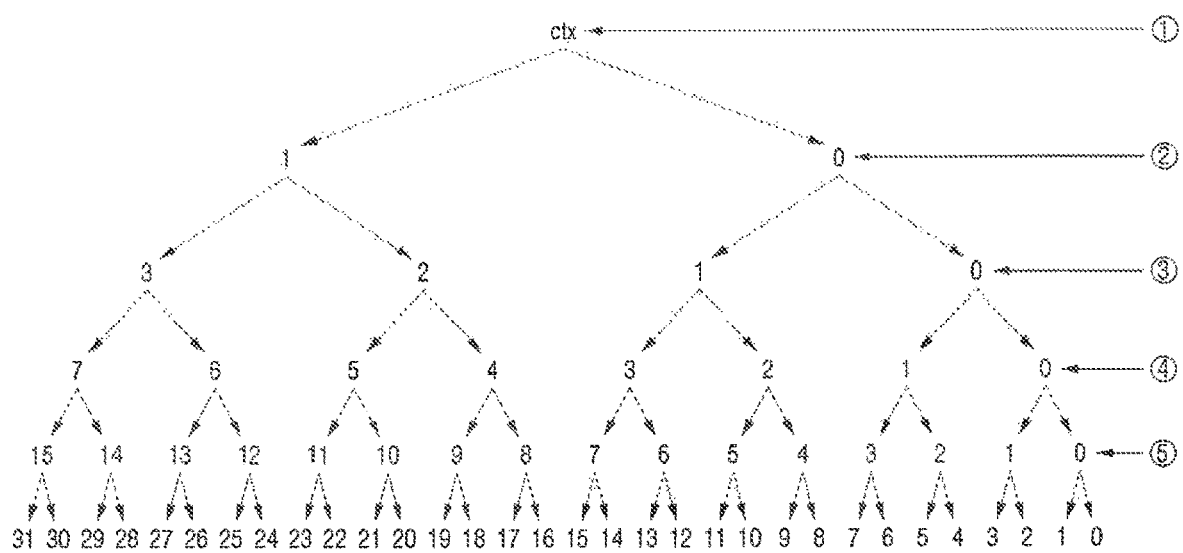
FIG. 14 is a conceptual diagram for structurally explaining the operation of the branch statement of FIG. 13.
FIG. 15 illustrates a lookup table of FIG. 12.

FIG. 13 is a detailed diagram of the branch statement 211a illustrated in FIG. 12. FIG. 14 is a conceptual diagram for structurally explaining the operation of the branch statement 211 a of FIG. 13.

Referring to FIG. 13, the branch statement 211a may include a plurality of branch statements. Although five branch statements are illustrated in FIG. 13, the current embodiments are not limited to this case.

X1, X2, X3 and X 11 specified in the branch statement 211a indicate the values of the first pixel X1, the second pixel X2, the third pixel X3 and the eleventh pixel X11, respectively. If pixels referred to are changed, the branch statement 211a may also be changed. That is, for the sake of convenience, the branch statement 211a of FIG. 13 is created based on the assumption that the first pixel X1, the second pixel X2, the third pixel X3 and the eleventh pixel X11 are input.

A first branch statement ① defines that the context ctx is 1 if the absolute value of a difference between the value of the eleventh pixel X11 and the value of the second pixel X2 is larger than 10 and is 0 if not.

A second branch statement ② defines that the context ctx is doubled ("<<1" is a bitwise operation of binary numbers and represents double as a number) and then 1 is added to the doubled context ctx if the value of the eleventh pixel X11 is larger than the value of the second pixel X2 and that the context ctx is only doubled if not.

A third branch statement ③ defines that the context ctx is doubled and then 1 is added to the doubled context ctx if the value of the eleventh pixel X11 is larger than the value of the first pixel X1 and that the context ctx is only doubled if not.

A fourth branch statement ④ defines that the context ctx is doubled and then 1 is added to the doubled context ctx if the value of the second pixel X2 is larger than the value of the first pixel X1 and that the context ctx is only doubled if not.

A fifth branch statement ⑤ defines that the context ctx is doubled and then 1 is added to the doubled context ctx if the value of the second pixel X2 is larger than the value of the third pixel X3 and that the context ctx is only doubled if not.

Referring to FIG. 14, the context ctx may have $2^5=32$ values through a total of five branch statements. When the number of branch statements is changed, the number of values of the context ctx may also be changed. That is, the context ctx can have a total of 32 values ranging from 0 to 31.

Specifically, the context ctx may branch into 0 and 1 through the first branch statement ① and may branch into a total of four values ranging from 0 to 3 through the second branch statement ②. The context ctx may branch into a total of eight values ranging from 0 to 7 through the third branch statement ③ and may branch into a total of 16 values ranging from 0 to 15 through the fourth branch statement ④. Finally, the context ctx may branch into a total of 32 values ranging from 0 to 31 through the fifth branch statement ⑤.

FIG. 15 illustrates the lookup table 211b of FIG. 12.

Referring to FIG. 15, the lookup table 211b may have a table of group information values corresponding to context values. In FIG. 15, ctxPredLookUpLuma denotes a lookup table for a luma signal block of YUV data, and ctxPredLookUpChroma denotes a lookup table for a chroma signal block of YUV data.

That is, the context ctx may branch into values ranging from 0 to 31, and the group information Gr corresponding to the context ctx may have six values ranging from 0 to 5 as illustrated in FIG. 15. Here, the number of values of the group information Gr can vary as needed. The number of values of the group information Gr may correspond to the number of equations included in the prediction equation 211c.

Figures 16, 17:
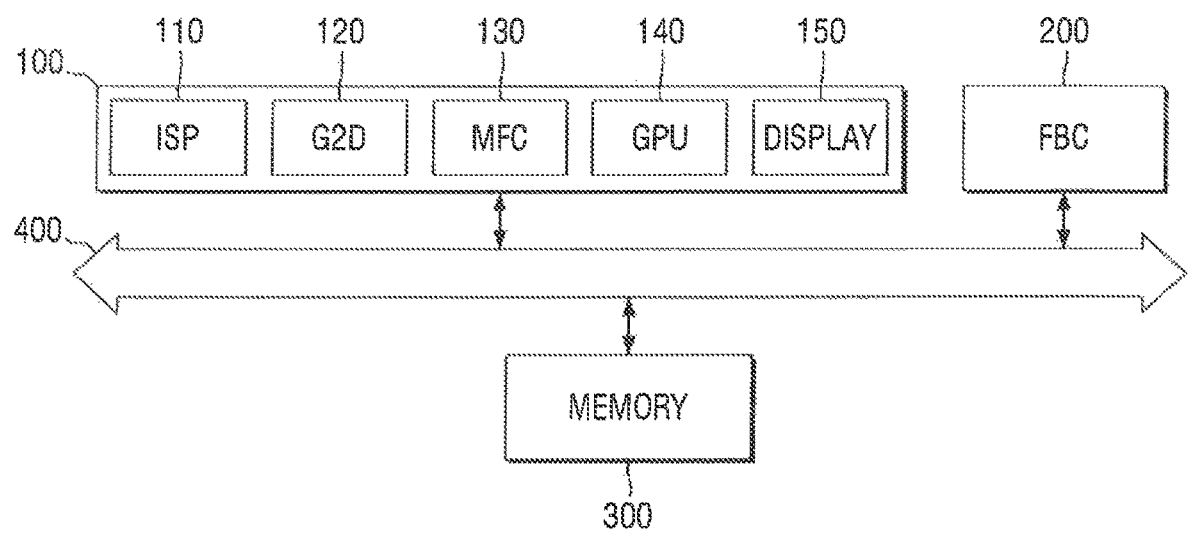
FIG. 16 is a detailed diagram of a prediction equation illustrated in FIG. 12.
FIG. 17 is a block diagram of an image processing device according to an exemplary embodiment of the inventive concept.

FIG. 16 is a detailed diagram of the prediction equation 211c illustrated in FIG. 12.

Referring to FIG. 16, the prediction equation 211c may include equations for Xp0, Xp1, Xp2, Xp3, Xp4 and Xp5 corresponding to six values of the group information Gr ranging from 0 to 5. Specifically, when the group information Gr is 0, 1, 2, 3.4 and 5, Xp0, Xp1. Xp2, Xp3, Xp4 and Xp5 may be employed as Xp, that is, the prediction data Xp. If the group information Gr is 0. Xp0 may be the prediction data Xp. Accordingly, the residual r may be a difference (i.e., Xp0) between a data value X of a pixel and the prediction data Xp.

When performing prediction within a group, the prediction module 211 of the image processing device according to at least one embodiment of the inventive concept can perform more accurate and reliable prediction by considering the relationship with neighboring pixels using context prediction. If prediction data is precisely obtained, the difference between the prediction data and the value of a pixel, that is, a residual can be represented by less bits. Therefore, the efficiency of data compression can be increased.

An image processing device according to an exemplary embodiment of the inventive concept will now be described with reference to FIG. 17.

FIG. 17 is a block diagram of an image processing device according to an exemplary embodiment of the inventive concept.

Referring to FIG. 17, an FBC 200 of the image processing device according to the embodiments is directly connected to a system bus 400.

The FBC 200 is not directly connected to a multimedia IP 100 but is connected to the multimedia IP 100 through the system bus 400. Specifically, each of an ISP 110, a G2D 120, an MFC 130, a GPU 140 and a display 150 of the multimedia IP 100 may exchange data with the FBC 200 through the system bus 400 and transmit data to a memory 300 through the system bus 400.

That is, in a compression process, each of the ISP 110, the G2D 120, the MFC 130, the GPU 140 and the display 150 of the multimedia IP 100 may transmit the second data to the FBC 200 through the system bus 400. Then, the FBC 200 may compress the second data into the third data and transmit the third data to the memory 300 through the system bus 400.

Similarly, in a decompression process, the FBC 200 may receive the third data stored in the memory 300 through the system bus 400 and decompress the third data into the second data. Then, the FBC 200 may transmit the second data to each of the ISP 110, the G2D 120, the MFC 130, the GPU 140 and the display 150 of the multimedia IP 100 through the system bus 400.

In the current embodiment, although the FBC 200 is not individually connected to the ISP 110, the G2D 120, the MFC 130, the GPU 140 and the display 150 of the multimedia IP 100, it can still be connected to the ISP 110, the G2D 120, the MFC 130, the GPU 140 and the display 150 of the multimedia IP 100 through the system bus 400. Therefore, hardware configuration can be simplified, and operation speed can be improved.

An image processing device according to an embodiment of the inventive concept will now be described with reference to FIG. 18.

Figure 18:
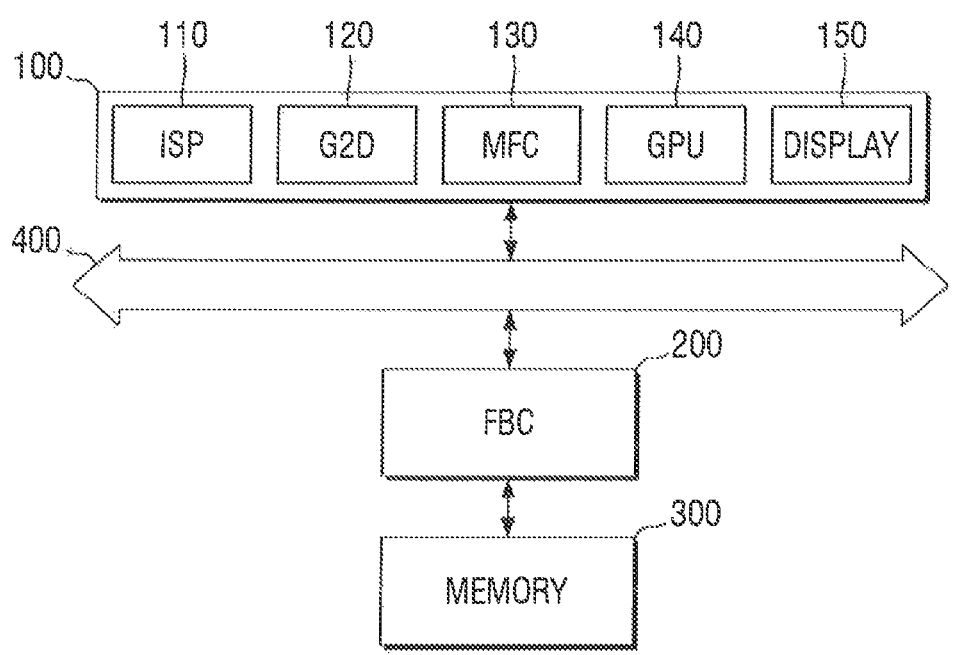
FIG. 18 is a block diagram of an image processing device according to an exemplary embodiment of the inventive concept.

FIG. 18 is a block diagram of an image processing device according to an exemplary embodiment of the inventive concept.

Referring to FIG. 18, the image processing device according to an exemplary embodiment is configured such that a memory 300 and a system bus 400 are connected to each other through an FBC 200.

That is, the memory 300 is not directly connected to the system bus 400 and is connected to the system bus 400 only through the FBC 200. In addition, an ISP 110, a G2D 120, an MFC 130, a GPU 140 and a display 150 of a multimedia IP 100 may be directly connected to the system bus 400. Therefore, the ISP 110, the G2D 120, the MFC 130, the GPU 140 and the display 150 of the multimedia IP 100 can access the memory 300 only through the FBC 200.

Since the FBC 200 is involved in all accesses to the memory 300 in the current embodiment, the FBC 200 may be directly connected to the system bus 400, and the memory 300 may be connected to the system bus 400 through the FBC 200. This can reduce errors in data transmission and improve speed.

What is claimed is:

1. An image processing device for processing an image data which includes a plurality of pixels arranged in a plurality of rows and a plurality of columns, the image processing device comprising:
　a processor which configured to,
　　divide each row into a plurality of groups sequentially arranged with each other, each group includes a same number of pixels,
　　perform prediction on a first pixel of every group in a first row based on at least one previous predicted pixel located within a second other row at a first time, and
　　perform prediction on a second pixel of every group in the first row based only on the first pixel of every group in the first row at a second time which is a sequential time of the first time,
　　wherein the first row is one of among the plurality of rows, except a top row.

2. The image processing device of claim 1, wherein one group among the plurality of groups includes remaining pixels to subtract pixels of previous groups in a corresponding row.

3. The image processing device of claim 1, wherein the previous predicted pixel includes at least one of upper pixels of a corresponding group in an upper row.

4. The image processing device of claim 1, wherein the processor is configured to,
　set prediction data of a first pixel of a first group in the top row to half of a bit depth at a third time before the first time, and
　perform prediction on a second pixel of a first group in the top row based on the first pixel of the first group in the top row after the third time.

5. The image processing device of claim 4, wherein the processor is configured to,
　perform prediction compensation on the first pixel of the first group in the top row to have the bit depth,
　perform prediction compensation on the second to last pixel of the first group in the top row base on the previous compensated pixel of the first group in the top row, perform prediction compensation on the first pixel of a next group in the top row based on the first pixel of a previous group in the top row, perform prediction compensation on the second to last pixel of the next group in the top row based on the left side pixel of the corresponding pixel in the next group of the top row.

6. The image processing device of claim 3, wherein the perform of the prediction on the first pixel performs a prediction based on at least one of an upper pixel of the first pixel of the corresponding group in the first row, a left-side pixel of the upper pixel and the right side pixel of the upper pixel.

7. The image processing device of claim 3, wherein the performing prediction on the first pixel of the first group in the first row is configured to, perform prediction based on at least one upper pixel of the first pixel of the first group in the first row and a right-side pixel of the upper pixel.

8. The image processing device of claim 1, wherein the processor is configured to, perform prediction on a second to last pixel in each of the groups using the previous predicted pixel for differential pulse-code modulation.

9. An image processing device for processing an image data which includes a plurality of pixels arranged in a plurality of rows and a plurality of columns, the image processing device comprising:

a processor, which configured to, divide each row into a plurality of groups sequentially arranged with each other, each group includes same number of pixels, perform prediction on a first pixel of a every group in a first row based only on at least one of an upper pixel of the first pixel in a second other row and a right-side pixel of the upper pixel in the second other row at a first time, perform prediction on a second pixel of every group in the first row based only on the first pixel of a corresponding group in the first row at a second time, wherein the first row is one of among the plurality of rows, except a top row.

10. The image processing device of claim 9, wherein the prediction on the second pixel is further based on at least one predicted upper pixel in an upper row of the first row.

11. The image processing device of claim 9, wherein the processor is configured to:

generate a context of a current pixel of the current group in a current row using the values of the previous predicted pixels in the current row and an adjacent row, output group information corresponding the context in a lookup table, and produce a prediction data and a residual using a predetermined equation corresponding to the group information.

12. The image processing device of claim 11, wherein the image processing device comprises:

a prediction module including a plurality of branch statements, each branch statement generates the context of the current pixel using the value of the previous predicted pixel, wherein the prediction module comprises:

the lookup table including a plurality of group information corresponding to the context; and a plurality of predetermined equations corresponding to the plurality of group information respectively.

13. The image processing device of claim 11, wherein the lookup table comprises a lookup table for a luma signal block of YUV data and a lookup table for a chroma signal block of YUV data.

14. An image processing device for processing an image data which includes a plurality of pixels arranged in a plurality of rows and a plurality of columns, the image processing device comprising:

a processor, wherein each row of the plurality of rows includes a plurality of groups, wherein the processor is configured to, perform prediction on a first pixel of every group in a current row based on an upper pixel in an upper row above the current row at a first time, and perform prediction on respective remaining pixels in every group in the current row based only on the first pixel or only on a previous predicted pixel in the corresponding group of the current row sequentially after the first time, wherein the current row is one of among the plurality of rows, except a top row.

15. The image processing device of claim 14, wherein the previous predicted pixel further includes at least one upper pixel of the one of the remaining pixels.

16. The image processing device of claim 15, wherein when performing prediction on pixels in the top row, the processor is configured to, perform prediction on a first pixel of a first group to half of a bit depth at a second time before the first time, and perform prediction on second to last pixels of the first group in the top row based on a respective left-side pixel of the first group in the top row sequentially after the second time.

17. The image processing device of claim 16, wherein the processor is configured to, perform prediction on a first pixel of a second to a last group in the top row based on the first pixel of the previous group in the top row, and perform prediction on respective remaining pixels of the second to the last group in the top row based on a respective left-side pixel of the corresponding group in the top row.

* * * * *